United States Patent [19]
Ioki

[11] Patent Number: 6,078,451
[45] Date of Patent: Jun. 20, 2000

[54] METHOD AND APPARATUS FOR ADJUSTING DATA WINDOW PHASE WHEN RETRIEVING DATA STORED ON A RECORDING MEDIUM

[75] Inventor: Kazuya Ioki, Ohmihachiman, Japan

[73] Assignee: International Business Machines Corporation, Armonk, N.Y.

[21] Appl. No.: 08/933,209

[22] Filed: Sep. 16, 1997

[30] Foreign Application Priority Data

Sep. 17, 1996 [JP] Japan .................................. 8-244773

[51] Int. Cl.⁷ ........................................................ G11B 5/09
[52] U.S. Cl. ................................................................ 360/51
[58] Field of Search ........................... 360/51, 43; 369/59

[56] References Cited

U.S. PATENT DOCUMENTS

| | | |
|---|---|---|
| 4,472,686 | 9/1984 | Nishimura et al. ....................... 329/50 |
| 4,808,884 | 2/1989 | Hull et al. ................................ 375/120 |
| 4,868,853 | 9/1989 | Izumita et al. ........................... 375/111 |

*Primary Examiner*—W. Chris Kim
*Attorney, Agent, or Firm*—G. Marlin Knight

[57] ABSTRACT

A method and apparatus are described for controlling a phase of the data window, using data patterns in addition to any dedicated sync patterns to improve the synchronization when decoding data from a magnetic recording medium, such as, for example, a floppy diskette. A data window is generated to separate the data pulses from the clock pulses in a pulse series which has been recorded using a method which generates peak shifts such as MFM (Multi-Frequency Modulation) or FM. When a pulse series that matches any of a set of predetermined bit patterns is found in the data, the phase of the data window signal is adjusted based on the deviation of the timing of a selected transition in the pattern from the expected ideal value. Preferably the bit patterns have a plurality of symmetrically arranged bits and include a criterion position that is not affected by a peak shift. The pulse series from the recording medium is separated into data pulses and clock pulses by using the adjusted data window.

13 Claims, 5 Drawing Sheets

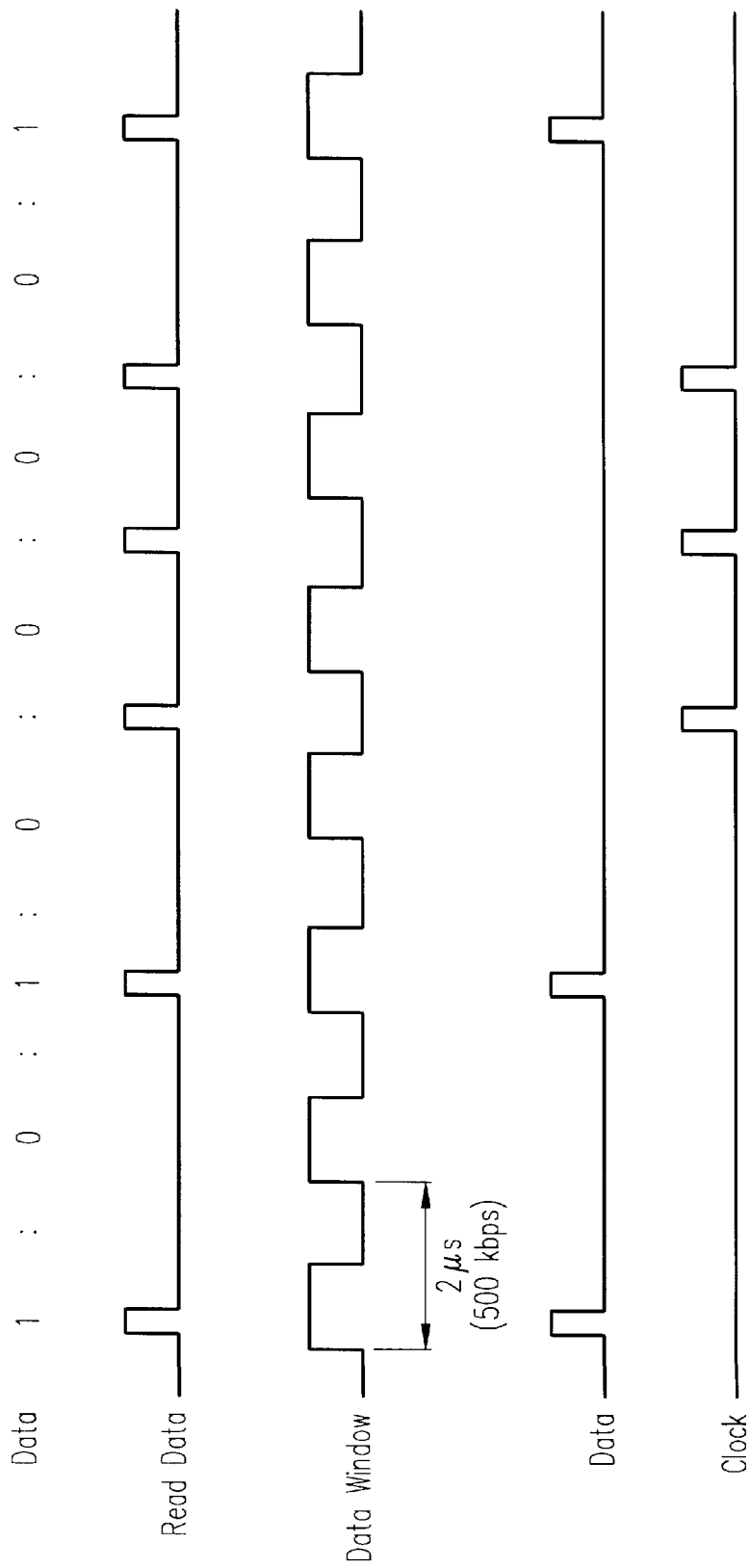

METHOD AND APPARATUS FOR ADJUSTING DATA WINDOW PHASE WHEN RETRIEVING DATA STORED ON A RECORDING MEDIUM

FIELD OF THE INVENTION

The present invention relates to a method and an apparatus for retrieving data stored on a recording medium, and in particular to a method for adjusting a phase of a data window in accordance with a pulse series obtained from a magnetic recording medium on which data are stored by using the MFM (Multi-Frequency Modulation) or FM methods.

BACKGROUND OF THE INVENTION

The MFM (Multi-Frequency Modulation) recording method is employed as a current standard recording method for floppy disks used by computers. FIG. 1 is a diagram for explaining the MFM recording method. As for a floppy disk on which data are stored using the MFM recording method, when a bit "1" is stored in the floppy disk, one pulse (one data pulse) occurs as data read from the floppy disk. While when a bit "0" is stored in it, no pulse occurs as data read from it. However, when the sequentially arranged adjacent bits have a value "0" respectively, a pulse (a clock pulse) occurs at a position midway between the adjacent bits.

In order to read data from a floppy disk on which data are recorded using the MFM recording method, pulses in read data must be precisely separated into data pulses and clock pulses because values to be reproduced differ depending on whether specific pulses are data pulses or clock pulses. A data window is employed to separate the data pulses and the clock pulses from the read data. Basically, this window contains clock pulses having a constant interval. When the data window signal is at a high level and a peak occurs while data are being read, the peak is regarded as a data pulse and a data value of "1" is detected. When the data window signal is at a low level and a peak occurs while data are being read, the peak is regarded as a clock pulse, for both a data value preceding and a data value following the peak a data value of "0" is detected.

When only one pulse is written on a floppy disk, a waveform for an output signal obtained from the disk is an independent waveform, and the pulse position matches the peak portion of the independent waveform. When a plurality of pulses are written on the floppy disk, however, independent waveforms of respective pulses interfere with each other to form a synthetic waveform. As a result, some of the peak portions of the synthetic waveform are shifted from the peak positions (the pulse positions) of the original independent waveforms. The phenomenon wherein the peak position in a waveform is shifted from the original pulse position is called a peak shift.

FIG. 2 is a diagram for explaining a peak shift. In FIG. 2(a) is shown an output waveform when one pulse is written. As is shown in FIG. 2(a), the pulse position matches the peak position of an independent waveform, and no peak shift occurs. In FIG. 2(b) is shown a peak shift for a synthetic waveform. In FIG. 2(b), a waveform indicated by the broken line is an ideal output waveform when pulses are respectively read, and a waveform indicated by the solid line is an actual output waveform. A plurality of independent waveforms interfere with each other, and a peak shift occurs between the peak portion of the actual waveform and that of the ideal waveform.

This phenomenon constitutes a large problem for a magnetic recording medium. It is assumed that a specific peak is shifted because it is magnetically affected by adjacent peaks.

An accurate data window is required for a floppy disk controller to precisely separate read data into data pulses and clock pulses, and to reproduce information at a low data error rate. The separation of the read data is performed by a data separator circuit.

A data window is generated based on read data from the floppy disk. FIG. 3 is a block circuit diagram illustrating the structure of a data separator. The data separator comprises a data window generator 30 and a separation circuit 31. The data window generator 30 includes a phase detector 32, a filter/amplifier 33, and an oscillator 34. As data is read, it is input to the phase detector 32, and the output of the phase detector 32 is transmitted to the oscillator 34 via the filter/amplifier 33. The output of the oscillator 34 is transmitted as a data window signal to the separation circuit 31. At the same time, this signal is fed back to the phase detector 32. Based on the phase of the data window signal, the separation circuit 31 separates the read data into data pulses and clock pulses. The data window is adjusted to obtain the optimal state in accordance with the follow-up speed of a feedback loop, and an amplifier gain is set to the optimal state by an external controller. In this manner, the data separator generates a data window signal, and controls the synchronization of the read data and the data window. In other words, the feedback loop is employed to control the center of the data window so that it is always positioned at the center of the pulse.

Some formats for magnetic disks include a sync area at the head of an ID field and the head of a data area, as well as an "IBM" format for a floppy disk. The sync area has a data structure in which a continuous line of bits having a value of "0" are arranged. Therefore, the pulses in the field form a pulse series consisting only of clock pulses that are arranged at the same intervals. In this case, since preceding and succeeding pulses interfere equally with a specific pulse, no peak shift occurs for such a pulse. When the data reading is locked (synchronized) with this pulse series in the sync area, a quick lock-in is enabled and an accurate data window can be obtained.

In one conventional example, once synchronization is acquired by using the sync area when the data are read from a disk, the data window is merely set to follow only changes in the rotation rate of the disk. Since this method employs only the sync area to control the phase of the data window, and ignores the data area, it is difficult to provide delicate control following a change in the rotation rate of the disk.

As another conventional method, compensation for pulse writing is performed, and a data area is used to obtain synchronization with the compensation process. Based on the relationship of adjacent bits to be written in the data area, the portion where it is anticipated a peak shift will occur is written while being shifted in advance in a direction opposite to the peak shift direction. According to this method, since not only a pulse in the sync area but also a pulse in the data area are employed, more delicate control is possible relative to the change in rotation of a disk, as well as, the deformation of the disk. However, the peak shift writing compensation may cause a new peak shift at another pulse. Thus, when the pulse with which a peak shift occurs is used for the control of the phase of the data window, it is difficult to generate an accurate data window.

SUMMARY OF THE INVENTION

The invention includes a method and apparatus for controlling a phase of the data window, using data patterns in addition to any dedicated sync patterns to improve the synchronization when decoding data from a magnetic recording medium, such as, for example, a floppy diskette. A data window is generated to separate the data pulses from the clock pulses in a pulse series which has been recorded using methods such as MFM or FM methods. When a pulse series that matches any of a set of predetermined bit patterns is found in the data, the phase of the data window signal is adjusted based on the deviation of the timing of a selected transition in the pattern from the expected ideal value. Preferably the bit patterns have a plurality of symmetrically arranged bits and include a criterion position that is not affected by a peak shift. The pulse series from the recording medium is separated into data pulses and clock pulses by using the adjusted data window. The apparatus comprises a memory for storing a plurality of bit patterns, each of the bit patterns selected to have a peak at which there is no peak shift. Preferably the bits in the patterns are symmetrically arranged. A pattern detector compares the pulse series being read with each of the bit patterns.

A means for measuring intervals is used to determine the timing of the transitions in the pulse series. This timing information is used to compute a deviation from an expected value for a criterion point in the bit pattern. The deviation is used by phase comparator to control the phase of the data window to bring the data window signal into closer synchronization with the pulse series. According to one aspect of the invention, the width of the data window is controlled.

BRIEF DESCRIPTION OF THE DRAWINGS

FIG. 1 is a diagram for explaining the MFM recording method;

DESCRIPTION OF THE PREFERRED EMBODIMENTS

In the following embodiment, an explanation will be given for a method for reading data from a floppy disk on which data are stored using the MFM recording method. There is a sync area and a data area on a floppy disk, and since "0" data values are arranged continuously in the sync area, only clock bits exist therein. Therefore, a peak shift does not occur in this area. In the data area are stored clock pulses and data in accordance with the MFM recording method. To read data, first, the sync area is specified, and based on a clock pulse in the field, synchronization of the data window is acquired.

Figure 2A:
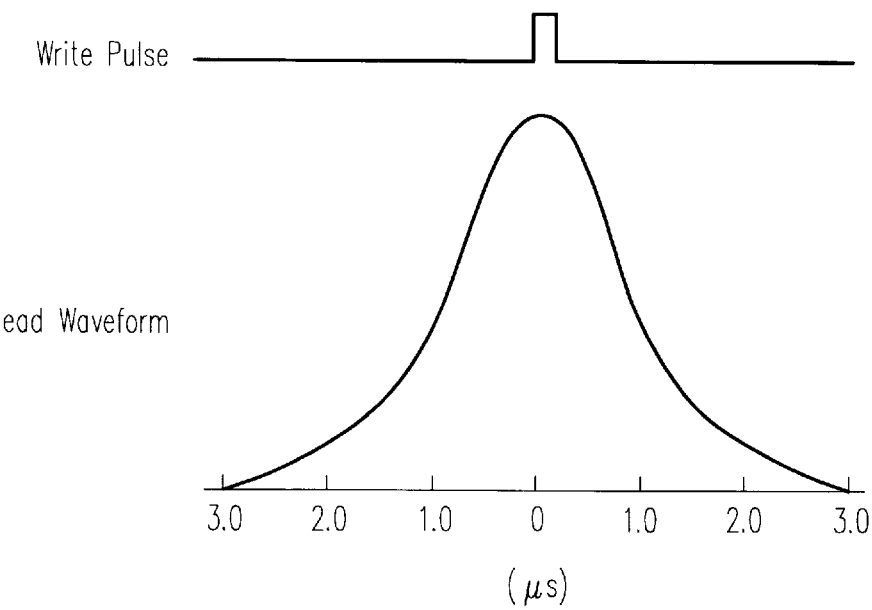
FIG. 2 is a diagram for explaining a bit shift.
Figure 2B:
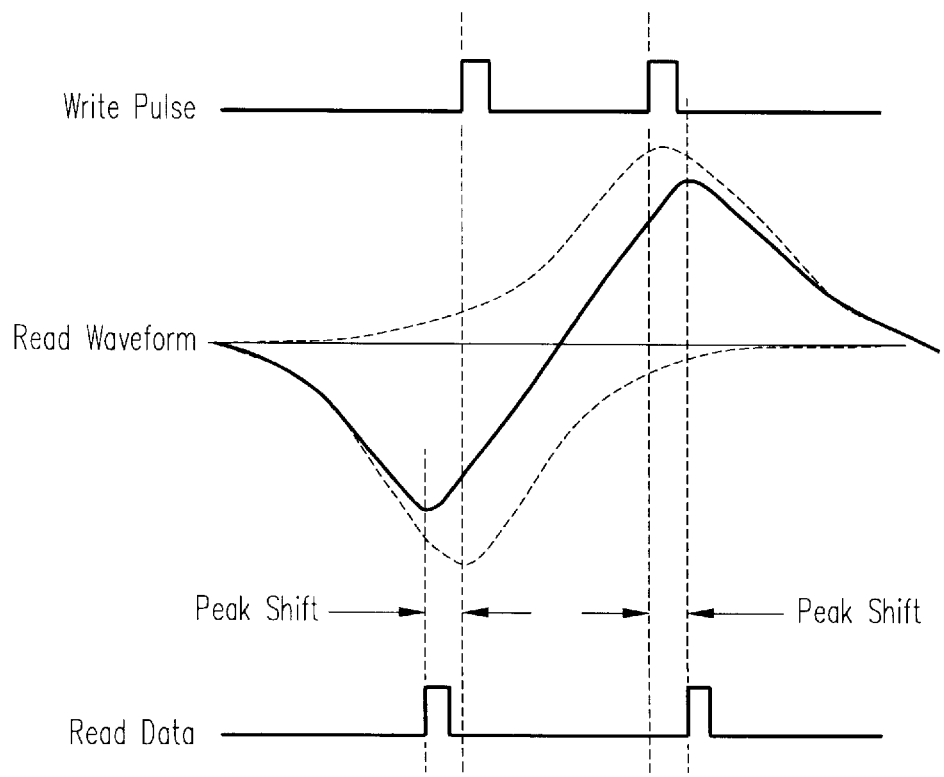
Figure 3:
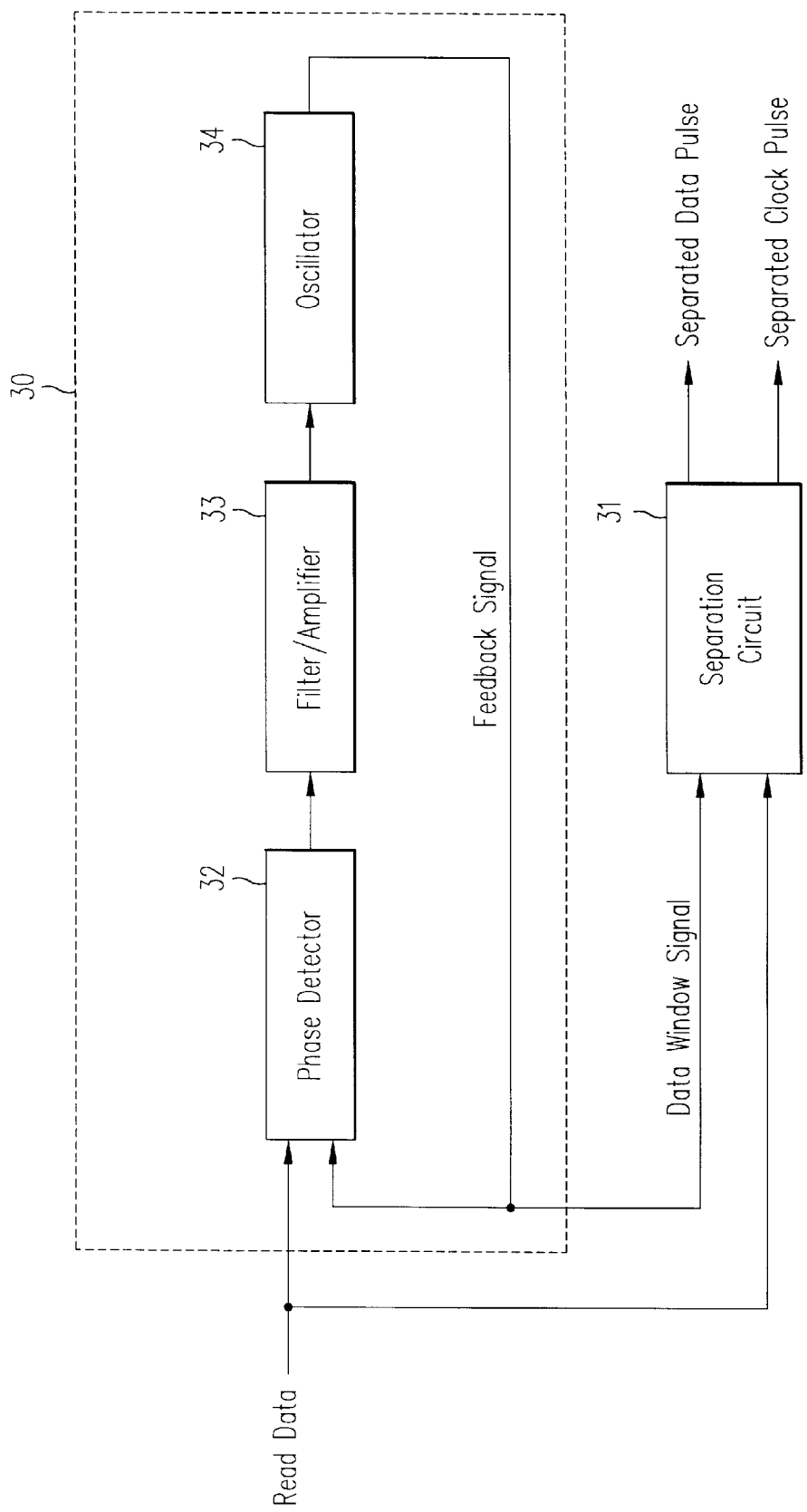
FIG. 3 is a block diagram illustrating the circuit structure of a data separator.
Figure 4:
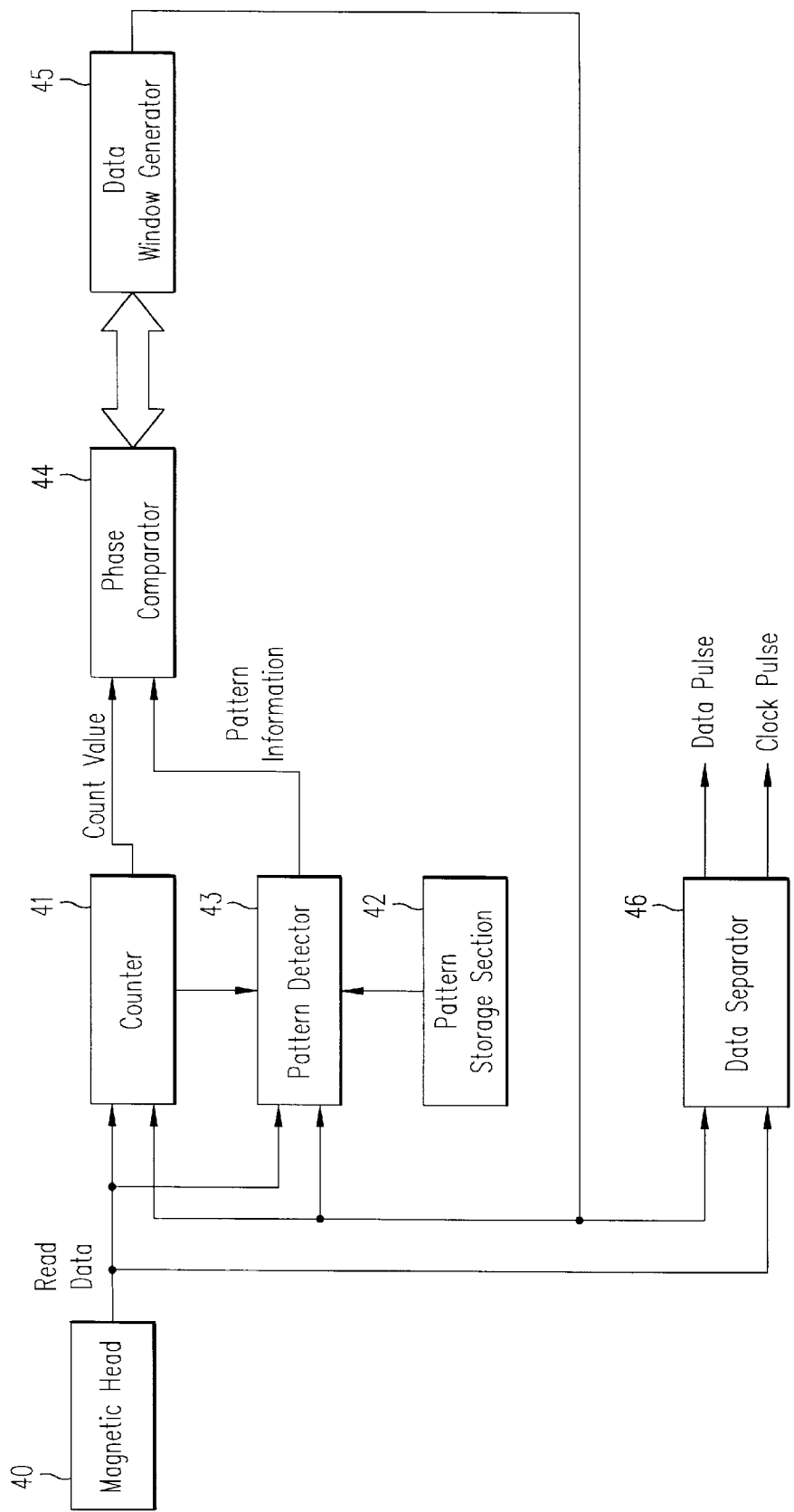
FIG. 4 is a block diagram illustrating the reading structure of a reading/writing controller according to one embodiment of the present invention.
Figure 5A:
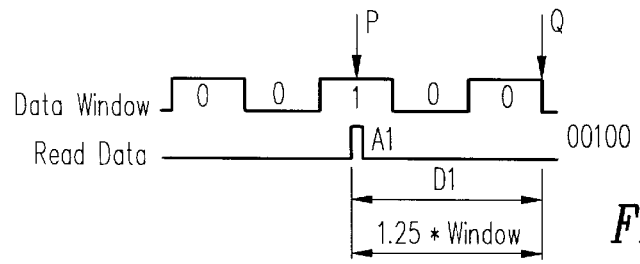
FIG. 5 is a diagram for explaining the relationship for bit patterns between a data window and read data.
Figure 5B:
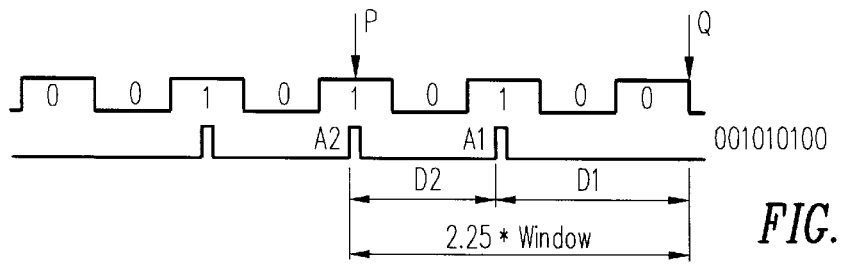
Figure 5C:
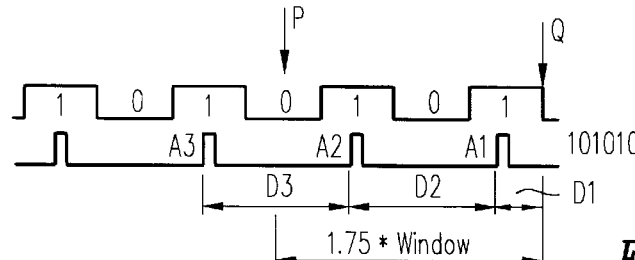
Figure 5D:
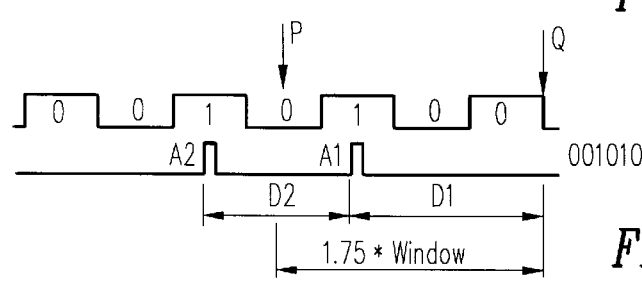
Figure 5E:
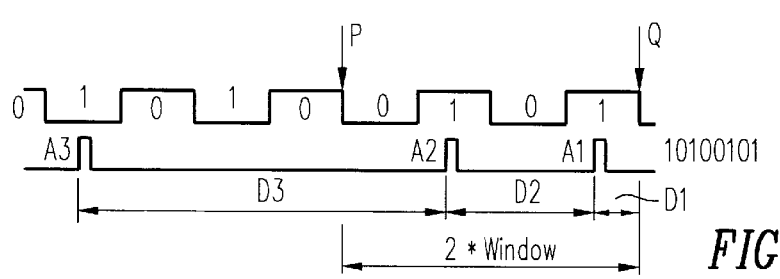
Figure 5F:
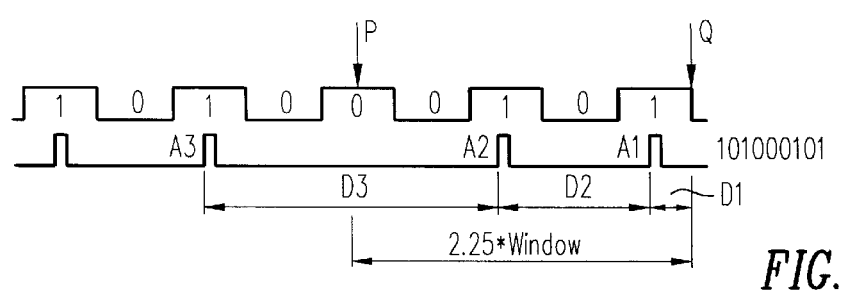

FIG. 4 is a block diagram illustrating the reading arrangement of a reading/writing controller for a magnetic recording medium according to this embodiment. First, a magnetic head 40 outputs read data in accordance with data previously written in the data area on the floppy disk. These data are obtained from the floppy disk by processing an analog output waveform, and have a digital waveform.

A counter 41 counts the intervals between adjacent pulses in the read data and output by the magnetic head 40, and the intervals between data windows. These counts are transmitted to a phase comparator 44.

A pattern storage section 42 stores a plurality of bit patterns, in each of which bit lines are symmetrically arranged, side by side. Of the pulse series that are read from the magnetic head 40 and that have their waveforms shaped, in a pulse series (more precisely, at a specific position in the pulse series) that matches one of the bit patterns, there is no substantial peak shift, or the pulse series is not substantially affected by a peak shift. More specifically, the six following bit patterns are stored.

TABLE 1

| (pattern 1) | 00100 | (5 bits) |
| (pattern 2) | 001010100 | (9 bits) |
| (pattern 3) | 1010101 | (7 bits) |
| (pattern 4) | 0010100 | (7 bits) |
| (pattern 5) | 10100101 | (8 bits) |
| (pattern 6) | 101000101 | (9 bits) |

When one part of the read data matches one of the bit patterns (patterns 1 through 6) stored in the pattern storage section 32, a pattern detector 43 detects the matched pattern. The pattern detector 43 transmits the bit pattern and the matched portion in the read data to a phase comparator 44 as pattern information. The pattern detection is performed each time a data window is advanced.

The phase comparator 44 compares the pattern information received from the pattern detector 43 with the current window width information received from a data window generator 45, and calculates the shift of the phase of the data window from that of the received data. Based on the shift of the phase, the phase comparator 44 transmits to the data window generator 45 a control signal used for adjusting the data window generator 45.

The bit patterns will now be described in detail. FIG. 5 is a diagram for explaining the relationship between the data window and the read data for each of the above bit patterns. The read data is an output signal that is read by the magnetic head 40 and that has its waveform shaped.

In FIG. 5, an arrow P indicates a criterion point and an arrow Q indicates a detection point. Detection point Q is where the read data match a bit pattern. Criterion point P is a specific point in a bit pattern that is not affected by a peak shift. Since the bit pattern has a plurality of symmetrically arranged bits, as is described above, criterion point P is in the center of the bit pattern. Criterion point P serves as the center of a data window and as the point where a data window level is changed, as is shown in FIG. 5(e).

At criterion point P substantially no peak shift occurs or a peak shift has no substantial effect. This is because the distance between peaks is relatively long and a peak at criterion point P is not affected by another peak, or because adjacent peaks almost equally affect criterion point P and the effects obtained offset each other. In the bit pattern shown in FIG. 5(a), bit sets "00" are symmetrically located on either side of criterion point P. Even when a peak exists outside the bit sets "00," since peak A1 at criterion point P is distant from a peak outside by the interval shown in FIG. 5(a), peak A1 at criterion point P is not substantially affected. In a bit pattern shown in FIG. 5(c), although two peaks A2 and A3 exist on either side of criterion point P, these peaks are not substantially affected.

Criterion point P is represented by an interval it is separated from detection point Q (an interval for a data window). The time of this interval is calculated or measured by employing the count value held by the counter 41. For bit pattern "00100" in FIG. 5(a), criterion point P is "1.25*WINDOW," where "WINDOW" represents the length of one cycle of the data window signal.

The phase comparator 44 calculates three intervals D1, D2 and D3. Using the detection point as a reference and assuming that the closest pulse to the left of the detection point Q is A1, the second closest is A2 and the third closest is A3, interval D1 is the interval between detection point Q and pulse A1, and intervals D2 and D3 are the respective intervals between pulses A1 and A2, and between pulses A2 and A3. It should be noted that one data pattern has only interval D1 (FIG. 5(a)) and other data patterns have only intervals D1 and D2 (FIGS. 5(b) and 5(d)).

For the respective bit patterns, the phase shifting of the data window relative to the read data can be calculated by the following expressions which subtract the actual measured time intervals from the expected values.

TABLE 2

| | Bit pattern | Calculation |
| --- | --- | --- |
| (pattern 1) | 00100 | 1.25 * WINDOW - (D1) |
| (pattern 2) | 001010100 | 2.25 * WINDOW - (D1+ D2) |
| (pattern 3) | 1010101 | 1.75 * WINDOW - (D1 + D2 + 0.5 * D3) |
| (pattern 4) | 0010100 | 1.75 * WINDOW - (D1 + 0.5 * D2) |
| (pattern 5) | 10100101 | 2.00 * WINDOW - (D1 + D2 + 0.5 * D3) |
| (pattern 6) | 101000101 | 2.25 * WINDOW - (D1 + D2 + 0.5 * D3) |

When the calculation results obtained with the above expressions are positive, the phase of the data window is advanced, and the phase comparator 44 instructs the data window generator 45 to compensate for the shifted phase portion. When the calculation results obtained with the above expressions are negative, the phase of the data window is delayed, and the phase comparator 44 instructs the data window generator 45 to advance the shifted phase portion. The phase comparator 44 controls the phase and the width of the data window by transmitting such instructions to the data generator 45 as needed.

The data window generator 45 generates a data window based on a pulse series in the read data, and changes the phase of the data window as is instructed by the phase comparator 44. The width of the data window acquired as the result of the change in phase and the current width are employed to determine the next width. When the pattern detector 43 does not detect a pulse series that matches the bit pattern, the phase is not changed.

A data window signal generated by the data window generator 45 is fed back to the pattern detector 43, and is also transmitted to the counter 41. This signal is also transmitted with the read data to a data separator 46. The data separator 46 separates the read data into data pulses and clock pulses. In accordance with the separated data pulses, information stored on a magnetic disk is finally read.

As is described above, in this embodiment, bit patterns for which no peak shift occurs are stored in advance in the pattern storage section 42, and the bit patterns are compared with the read data. The pattern detector 43 detects in the read data a pulse series that is not affected by a peak shift, and the phase comparator 44 adjusts the phase of a data window by employing the detected pulse series. In accordance with the adjustment, the data window is synchronized precisely with the read data, and the data separator 46 uses this data window to adequately separate data pulses from clock pulses.

Although the MFM recording method has been described in the above embodiment, the present invention can be applied to another recording method, such as the FM recording method. Although the MFM recording method is generally employed for floppy disks, apparently, the present invention can be used for another recording medium where peak shifts occur.

As is described above, according to the present invention, when a pulse series in a data area matches one of a number of predetermined bit patterns, a criterion point in a bit pattern is employed as a reference for controlling the phase of the data window in the data area. Thus, the data window can be more delicately adjusted relative to the rotation change of a disk and the deformation of a disk, so that an error rate for read data can be reduced.

What is claimed is:

1. A method for retrieving data from a recording medium containing a data area in which a series of pulses are stored, comprising the steps of:

generating a data window signal used to detect the data pulses in a pulse series read from the recording medium;

comparing the pulse series with a plurality of stored bit patterns having at least one transition located at a fixed interval from a detection point in the stored bit pattern, and having a peak at which no peak shift occurs; and when a stored bit pattern is found in the pulse series, measuring a variable interval from the detection point to the transition in the pulse series then:

calculating a deviation as a function of the fixed interval and the variable interval; and using the deviation to adjust a phase of the data window signal to reduce a difference between a center of the data window signal and a center of a data pulse.

2. The method of claim 1, wherein the stored bit patterns are symmetrical about a midpoint.

3. The method of claim 1, wherein the measuring step uses a counter which counts from the detection point to the transition.

4. The method of claim 1, further comprising the step of using the deviation to adjust a width of the data window signal to reduce a difference between a center of the data window signal and a center of a data pulse.

5. The method of claim 1, wherein the pulse series is encoded using the Multi-Frequency Modulation (MFM) method.

6. The method of claim 5, wherein the stored bit patterns include "00100", "001010100", "1010101", "0010100", "10100101" or "101000101."

7. The method of claim 1, wherein the stored bit patterns include "00100", "001010100", "1010101", "0010100", "10100101" or "101000101."

8. The method of claim 1, the plurality of stored bit patterns comprising "00100", "001010100", "1010101", "0010100", "10100101" and "101000101."

9. An apparatus for adjusting a phase of a data window for retrieving data from a recording medium, comprising:

storage containing a plurality of bit patterns each having a transition located at a fixed interval from a detection point in the bit pattern and having a peak at which no peak shift occurs;

a pattern detector which compares a pulse series read from the recording medium with the bit patterns;

a counter which determines a variable interval between the detection point in the bit pattern and a transition in the pulse series;

a phase comparator which uses output from the counter and the pattern detector to adjust a phase of a data window signal when the bit pattern is detected in the pulse series so that a data pulse occurs in the center of the data window signal.

10. The apparatus according to claim 9, wherein the plurality of bit patterns comprises "00100", "001010100", "1010101", "0010100", "10100101" and "101000101."

11. The apparatus to claim 9, wherein the stored bit patterns are symmetrical about a midpoint.

12. The apparatus according to claim 9, further comprising a data separator which uses the data window signal to separate the pulse series into clock and data pulses according to the Multi-Frequency Modulation (MFM) method.

13. The apparatus according to claim 9, wherein the stored bit patterns include "00100", "001010100", "1010101", "0010100", "10100101" or "101000101."

* * * * *